Figure 1:
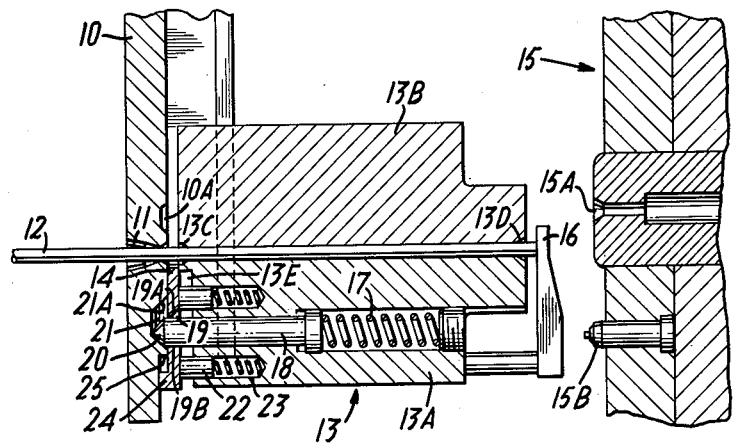

May 1, 1962 S. H. LEJDEGÅRD 3,031,908
APPARATUS FOR MAKING VALVE PUSH RODS AND THE LIKE
Filed June 20, 1958 2 Sheets-Sheet 1

May 1, 1962 S. H. LEJDEGÅRD 3,031,908
APPARATUS FOR MAKING VALVE PUSH RODS AND THE LIKE
Filed June 20, 1958 2 Sheets-Sheet 2

United States Patent Office 3,031,908
Patented May 1, 1962

3,031,908
APPARATUS FOR MAKING VALVE PUSH RODS AND THE LIKE
Sixten Harald Lejdegård, Hallstahammar, Sweden, assignor to Bultfabriks Aktiebolaget, Hallstahammar, Sweden, a corporation of Sweden
Filed June 20, 1958, Ser. No. 743,248
Claims priority, application Sweden July 10, 1957
4 Claims. (Cl. 83—456)

The present invention relates to an apparatus for making valve push rods and other articles of a similar shape, wherein a rod or wire is pushed lengthwise through a hole in a die into a clamping means to a predetermined length, whereafter said clamping means is moved at right angles with respect to the inpush direction of said rod in order to first shear off a predetermined length of the rod and then position said rod with one end thereof opposite a shaping surface in the die, and whereafter the rod by means of said clamping means is moved lengthwise into engagement with the shaping surface so that the rod at said one end thereof is given at least substantially its intended shape by cold heading, and whereafter said rod, also by cold heading but with the clamping means stationary, is given its intended shape at the other end thereof by means of a stamp which is movable to engage said other end. The object of the invention is to simplify and cheapen the manufacture of articles of the kind mentioned.

The invention is characterized substantially in that the shearing off of said rod is performed by means of a cutter which is movable as a unit with the clamping means only during the first part of its movement at right angles with respect to the inpush direction of the rod, and then, as the clamping means is moved to position said one end of the rod opposite the shaping surface in the die, the cutter is kept stationary in order to permit a movement of said clamping means in the longitudinal direction of the rod, whereby said cutter enters a recess in the clamping means.

The apparatus comprises a die which is adapted to shape one end of said rod and is provided with a through hole, through which a rod or wire is movable into engagement with an abutment, a clamping means which is movable towards and away from and along said die, and adapted to receive and hold the rod when the rod has been protruded a predetermined length, and a stamp which is adapted to shape the other end of said rod by cold heading, according to the present invention is characterized substantially in that said clamping means is provided with a separate cutter which is movable as a unit with said clamping means only during the first part of its movement along the die and is adapted to cooperate with the die at this step.

Preferably, the cutter is provided by a slide block which is slidable with respect to the die and is slidable as a unit with said clamping means only during the first part of its movement along the die and is then adapted to be stopped, e.g. by engagement with the die, in a position where it may enter a recess in the clamping means as the clamping means is moved towards the die so as to permit this movement of the clamping means without interference with the cutter.

The unitary movement of the cutter and the clamping means may, of course, be obtained in a number of ways, but preferably the apparatus is provided with a piston which is disposed in the clamping means and is movable towards and away from the die, and which protrudes through an aperture in the cutter and moves said cutter as the clamping means is moved along the die, and which is further adapted to cooperate with a guide means in the die, so that it is displaced from the aperture into a position, where it is ineffective for moving said cutter, after a part of the movement of the clamping means along the die.

The invention will now be described in more detail with reference to the accompanying drawings.

Figure 2:
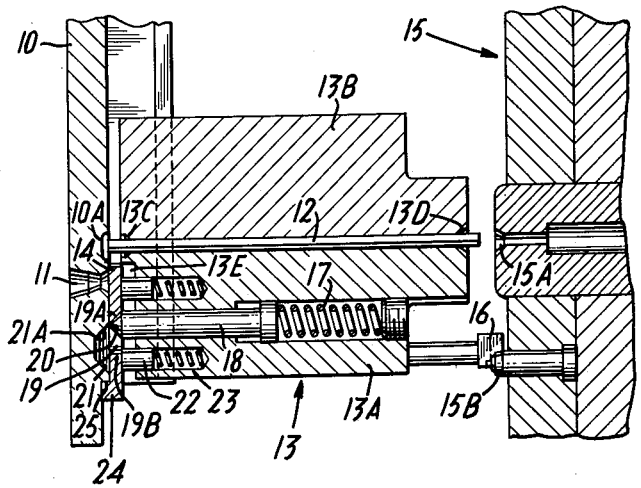
Figure 3:
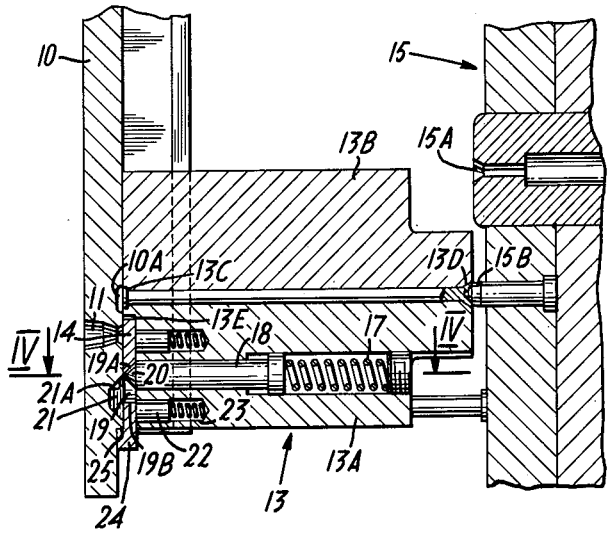
Figure 4:
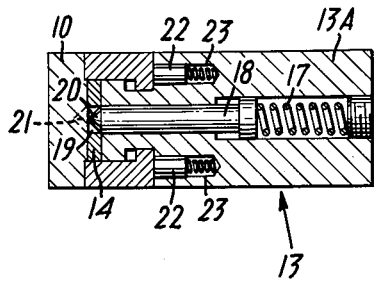

In the drawings, FIGS. 1 to 3 illustrate in vertical sections an apparatus according to the invention in three successive steps of operation, and FIG. 4 shows a section along line IV—IV in FIG. 3.

The apparatus, which is shown as an example, comprises a die 10 with a through hole 11, through which a rod 12 may be passed. The apparatus further comprises a clamping means which is provided by two jaws 13A and 13B. The clamping means is movable towards and away from and along the die 10 by means of suitable means not shown in the drawings. The clamping means is provided with a separate cutter 14 which is movable in unison therewith along the die and is adapted to cooperate with the die to shear off the rod 12 which protrudes from the hole 11. Further, the apparatus shown comprises a stamp 15 and a swingable abutment member 16.

In the clamping means 13 there is disposed a piston 18 which is movable towards and away from the die 10 and is loaded by a spring 17. The piston protrudes through an aperture 19 with a cam surface 19A in the cutter 14, which is formed as a movable slide block, and moves said slide block as the clamping means 13 is moved along the die 10. The piston is provided with a conical end portion 20, which enters a groove shaped guide means 21 in the die. The guide means 21 is provided with a cam surface 21A with which the conical end portion 20 of the piston cooperates.

In the embodiment shown, the die 10 is formed with only one shaping surface 10A and the stamp 15 is provided with one pre-stamp 15A and one specific shaping stamp 15B. The clamping means is further provided with shaping cavities 13C, 13D. Moreover, the clamping means 13 is provided with a recess 13E of such a size that it accommodates the cutter 14 when the clamping means is moved up against the die 10, as will be disclosed in more detail hereinafter. The cutter is urged towards the die 10 by means of resilient pins 22 which are disposed in bores 23 in the clamping means 13.

The apparatus as disclosed above operates in the following manner:

With the parts in the positions shown in FIG. 1, the rod 12 by means of suitable means, not shown in the drawings, is pushed through the hole 11 in the die 10 and into the clamping means 13 until engagement with the abutment 16. Thereafter, the jaws 13A, 13B are brought together so as to clamp the rod securely. Then, the clamping means 13 is moved upwardly with respect to the die 10. Thereby the piston 18 will be moved upwardly and, due to the engagement of the piston with the edge of the aperture 19, also the cutter 14 will initially be moved upwardly such that the cutter shears off the rod 12. It should be noted that said engagement is insured by reason of the fact that the axial length of the conical end portion 20 of the piston is less than the depth of the groove 21, so that said end portion may enter the groove entirely under the action of the spring 17. As soon as the rod 12 has been sheared off, the conical end portion 20 of the piston engages the cam surface 21A of the groove 21 and, upon further movement of the clamping means upwardly, the piston 18 will be moved inwardly such that the conical end portion 20 thereof will engage the cam surface 19A of the cutter. The engagement of the piston 18 with the cutter 14 is thus interrupted and consequently the cutter will not follow the movements of the clamping means 13 any longer. The stopping of the cutter in this position is further insured by reason of the fact that a projection 24 thereon engages an abutment 25 on the die 10. The different parts now take the positions shown in FIG. 2, i.e. with one end of the rod 12 opposite the shaping cavity 10A and with the pre-stamp 15A opposite the other end of the rod 12.

When the above described shearing step has been performed, the stamp means 15 is moved towards the clamping means 13 which in turn will be moved up against the die 10. The clamping means and the die may then be brought close together in that the cutter 14 enters the recess 13E and thus does not interfere with this movement. Hereby, one end of the rod by cold heading is given a shape which is determined by the shaping cavities 10A and 13C, or at least substantially such a shape. At its other end the rod is provided with a thickening by means of the pre-stamp 15A. Then the stamp means 15 is moved upwardly to position the shaping stamp 15B opposite the thickened end portion of the rod 12, whereafter the stamp means is advanced once more towards the clamping means 13 into the position shown in FIG. 3. During this second shaping step the thickened end portion of the rod 12 is provided with a recess by means of the shaping stamp 15B and simultaneously the end portion which has been shaped by the shaping cavities 10A, 13A is given its desired shape if it has not already attained its final shape in the first shaping step. The different parts then return to their initial positions whereby the cutter 14 is retracted by means of the piston 18 which enters the aperture 19 of the cutter.

A great number of modifications and alterations as to details relating to the apparatus therefore may occur within the scope of the invention.

What I claim is:

1. A cutting mechanism for a metal rod working machine comprising the combination of a die assembly having a hole for insertion of the rod to be worked, clamping means for gripping said rod, said clamping means being movable laterally relatively to said hole and including a clamping member, a cutter disposed between said clamping member and said die assembly, said clamping member supporting a carrier for said cutter for lateral movement of said cutter simultaneously with said clamping member, and means on said die assembly for arresting movement of said cutter and simultaneous disengagement of said carrier with respect to said cutter for permitting continued movement of said clamping member without concurrent movement of said cutter.

2. A cutting mechanism for a metal rod working machine comprising the combination of a die assembly having a hole for insertion of the rod to be worked, clamping means for gripping said rod, said clamping means being movable laterally relatively to said hole and including a clamping member, a cutter disposed between said clamping member and said die assembly, said clamping member supporting a carrier for said cutter for lateral movement of said cutter simultaneously with said clamping member, and means on said die assembly for arresting movement of said cutter and simultaneous disengagement of said carrier with respect to said cutter for permitting continued movement of said clamping member without concurrent movement of said cutter, said carrier comprising a piston element reciprocable in said clamping member and normally urged toward said die, said cutter containing a hole to permit passage of said piston element into engagement with said die, and said die including means for urging said piston element into said clamping member when the movement of said cutter is arrested.

3. A cutting mechanism for a metal rod working machine comprising the combination of a die assembly having a hole for insertion of the rod to be worked, clamping means for gripping said rod, said clamping means being movable laterally relatively to said hole and including a clamping member, a cutter disposed between said clamping member and said die assembly, said clamping member supporting a carrier for said cutter for lateral movement of said cutter simultaneously with said clamping member, and means on said die assembly for arresting movement of said cutter and simultaneous disengagement of said carrier with respect to said cutter for permitting continued movement of said clamping member without concurrent movement of said cutter, said carrier comprising a piston element reciprocable in said clamping member and normally urged toward said die, said cutter containing a hole to permit passage of said piston element into engagement with said die, and said die including means for urging said piston element into said clamping member when the movement of said cutter is arrested, said clamping member being formed with a recess to receive said cutter when its lateral movement is arrested to permit movement of said clamping member toward said die.

4. A cutting mechanism for a metal rod working machine comprising the combination of a die assembly having a hole for insertion of the rod to be worked, clamping means for gripping said rod, said clamping means being movable laterally relatively to said hole and including a clamping member, a cutter disposed between said clamping member and said die assembly, said clamping member supporting a carrier for said cutter for lateral movement of said cutter simultaneously with said clamping member, and means on said die assembly for arresting movement of said cutter and simultaneous disengagement of said carrier with respect to said cutter for permitting continued movement of said clamping member without concurrent movement of said cutter, said carrier comprising a piston element reciprocable in said clamping member and normally urged toward said die, said cutter containing a hole to permit passage of said piston element into engagement with said die, and said die including means for urging said piston element into said clamping member when the movement of said cutter is arrested, said clamping member being formed with a recess to receive said cutter when its lateral movement is arrested to permit movement of said clamping member toward said die, and said clamping member being provided with means for normally urging said cutter into contact with the surface of said die but being retractable to permit reception of said cutter in said recess.

References Cited in the file of this patent

UNITED STATES PATENTS

| | | |
|---|---|---|
| 42,104 | Nettleton | Mar. 29, 1864 |
| 1,619,495 | Wilcox | Mar. 1, 1927 |
| 2,303,760 | Rafter | Dec. 1, 1942 |
| 2,559,140 | Wilcox | July 3, 1951 |
| 2,689,359 | Friedman | Sept. 21, 1954 |
| 2,733,503 | Beringer et al. | Feb. 7, 1956 |
| 2,755,544 | Moore | July 24, 1956 |
| 2,800,814 | Lewis | July 30, 1957 |